United States Patent Office 2,845,458
Patented July 29, 1958

2,845,458

C-CHLORO-N,N,N'-TRIMETHYLFORMAMIDINE HYDROCHLORIDE

Hans Z. Lecher, Plainfield, and Elizabeth M. Hardy, Bound Brook, N. J., and Clement L. Kosloski, North Easton, Mass., assignors to American Cyanamid Company, New York, N. Y., a corporation of Maine No Drawing. Application May 21, 1956
Serial No. 585,939

3 Claims. (Cl. 260—564)

This invention relates to C-chloro-N,N,N'-trimethylformamidine hydrochloride, and to a process for preparing it.

C-chloro-N,N,N'-trimethylformamidine hydrochloride is a colorless solid which is insoluble in carbon tetrachloride or benzene but soluble in methylene dichloride, ethylene dichloride and chloroform. It is particularly well suited as an intermediate in the preparation of pentaalkylguanidines. The latter compounds are excellent organic solvents. Pentaalkylguanidines are prepared by causing C-chloro-N,N,N'-trimethylformamidine hydrochloride to react with a secondary alkylamine in an inert anhydrous medium. This latter process is more fully described in and forms the subject matter of our copending application for United States Letters Patent, Serial No. 585,972, filed on even date.

C-chloroformamidine hydrochloride has been known for almost a century. As yet, its N,N,N'-trimethyl derivative has not been reported. C-chloroformamidine hydrochloride is generally prepared from cyanamide and hydrogen chloride. Alternatively, it may also be prepared by the action of concentrated hydrochloric acid on calcium cyanamide or lime nitrogen as disclosed in a recently issued U. S. Letters Patent 2,727,922 to Lecher and Kosloski. Obviously, this reaction does not lend itself to the preparation of the trimethyl derivative. C-chloroformamidine hydrochloride has been also obtained as a by-product while chlorinating S-alkylisothioureas in an aqueous medium to recover alkanesulfonyl chlorides according to the following reaction:

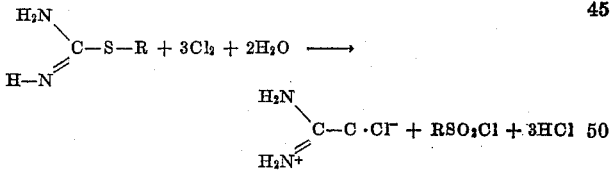

wherein R is an alkyl radical.

However, when the latter reaction is applied to N-alkyl-S-alkylisothioureas, a chloroformamidine salt is not obtained as expected but rather a trialkylurea is formed in accordance with the following reaction:

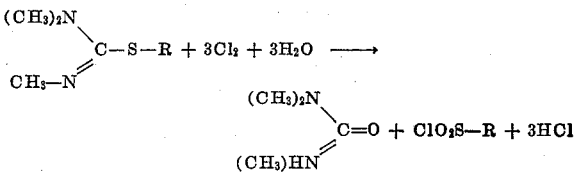

wherein R is an alkyl group.

It is an object of the present invention to prepare the novel compound: C-chloro-N,N,N'-trimethylformamidine hydrochloride. Other objects and advantages will become apparent from the ensuing description.

To this end, C-chloro-N,N,N'-trimethylformamidine hydrochloride can be obtained in good yield and purity by chlorinating the corresponding S-methyl or S-ethylisothiourea or its hydrochloride in carbon tetrachloride.

According to the present invention, a tetraalkylisothiourea is chlorinated in carbon tetrachloride according to the equations:

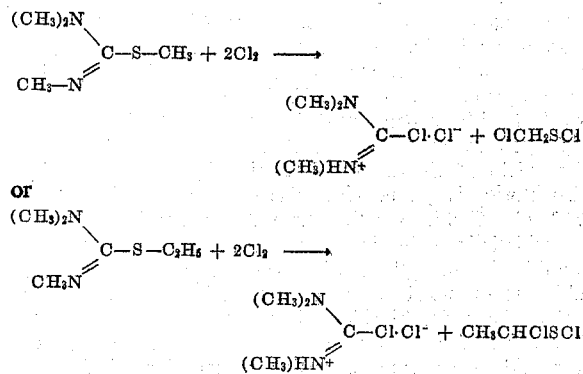

In the above reactions, the sulfenyl chlorides which are thought to form as by-products are relatively unstable compounds. The latter have not been isolated or identified. However, the formamidine hydrochloride is formed when several critical conditions are observed. Briefly then, these are:

(1) The order of addition of the reactants,
(2) The reaction medium,
(3) Quality of the isothiourea reactant, and
(4) Absence of water.

As to (1), it is found essential that the isothiourea reactant be added to an excess of chlorine in carbon tetrachloride. Where the isothiourea is added to an excess of chlorine, the isothiourea will be chlorinated before it has an opportunity to react with any sulfenyl chloride formed during reaction.

With respect to the reaction medium (2), it is a prerequisite that the C-chloro-N,N,N'-trimethylformamidine hydrochloride be insoluble in the anhydrous medium. In this fashion, the hydrochloride can crystallize out. The hydrochloride compound is too sensitive to be recovered by the evaporation of a solution. As a diluent, carbon tetrachloride is satisfactory.

As to (3), it is important that the isothiourea reactant be free from tetramethylurea which readily contaminates the reactant. Further, tetramethylurea reacts with chlorine and is a solvent for the C-chloro-N,N,N'-trimethylformamidine hydrochloride. Should any tetramethylurea be present, the latter hydrochloride separates in a smeary or oily condition.

One process for obtaining a suitable S-methyl- or S-ethyl-N,N,N'-trimethylisothiourea reactant to be employed herein has been disclosed in the copending application of Lecher and Hardy, Serial No. 585,921, also filed on even date. Briefly, that process is directed to the alkylation of N,N,N'-trialkylthioureas in an aqueous, strong non-oxidizing acid medium. The use of the S-methyl-N,N,N'-trimethylisothiourea reactant is particularly preferred herein because chloromethanesulfenyl chloride is more stable and more volatile than 1-chloroethanesulfenyl chloride. Instead of the isothiourea per se, its hydrochloride may also be used.

As to (4) above, anhydrous conditions must be maintained. In the presence of water, C-chloro-N,N,N'-trimethylformamidine hydrochloride will decompose.

The temperature during reaction should be kept below 50° C. and preferably below about 20° C. The lower limit for accomplishing the reaction is set by the freezing point of the carbon tetrachloride diluent at minus 22° C.

The invention will be illustrated by the following examples which are not intended to be limitative of the inven-

Example 1

240 parts of dry carbon tetrachloride is saturated with chlorine at 0° C. A solution of 6.7 parts of pure S-methyl-N,N,N'-trimethylisothiourea in 40 parts of dry carbon tetrachloride is gradually added to the agitated chlorine solution, the temperature of the reaction mixture being kept at 0° C.–10° C. Pale yellow crystals separate immediately. The agitated mixture is allowed to reach room temperature and kept there until the reaction is complete. The product is isolated by filtration and washed with carbon tetrachloride. At first it is a very light yellow, but it becomes colorless on drying in vacuo. The yield of C-chloro-N,N,N'-trimethylformamidine hydrochloride is quantitative. Its melting point is 69° C.–71° C. C-chloro-N,N,N'-trimethylformamidine hydrochloride is insoluble in carbon tetrachloride and benzene, soluble in methylene dichloride, ethylene dichloride, chloroform, nitrobenzene, glacial acetic acid. Water dissolves the hydrochloride with decomposition. When the hydrochloride is treated with freshly precipitated moist silver oxide in benzene suspension, trimethylurea is formed. Cold methanol dissolves it and decomposes slowly. It may be recrystallized from tetramethylurea.

Example 2

53 parts of dry carbon tetrachloride is saturated with chlorine at 0° C. A solution of 7.4 parts of pure S-ethyl-N,N,N'-trimethylisothiourea in 40 parts of carbon tetrachloride is added to the agitated chlorine solution of 0° C.–5° C. A pale yellow crystalline product precipitates immediately. The agitated mixture is allowed to reach room temperature and kept there until the reaction is complete. The product is isolated by filtration and washed with carbon tetrachloride. The yield is quantitative, but the product is not quite as pure as the one of Example 1, being apparently slightly contaminated with a chlorinated ethanesulfenyl chloride.

We claim:

1. A process for the preparation of C-chloro-N,N,N'-trimethylformamidine hydrochloride which consists in: adding an S-alkyl-N,N,N'-trimethylisothiourea to an agitated solution of chlorine in carbon tetrachloride at a temperature below 50° C., and then recovering C-chloro-N,N,N'-trimethylformamidine hydrochloride.

2. A process according to claim 1 wherein the S-alkyl-isothiourea is S-methyl-N,N,N'-trimethylisothiourea.

3. A process according to claim 1 wherein the S-alkyl-isothiourea is S-ethyl-N,N,N'-trimethylisothiourea.

References Cited in the file of this patent

UNITED STATES PATENTS 2,146,744    Johnson _____ Feb. 14, 1939

OTHER REFERENCES

Johnson et al.: Journal of the American Chem. Soc., vol. 61, pages 176–179 (1939).

UNITED STATES PATENT OFFICE
Certificate of Correction

Patent No. 2,845,458                                                                                         July 29, 1958

Hans Z. Lecher et al.

It is hereby certified that error appears in the printed specification of the above numbered patent requiring correction and that the said Letters Patent should read as corrected below.

Column 1, lines 48 to 52, for that portion of the equation reading

Signed and sealed this 21st day of April 1959.

[SEAL]

Attest:
KARL H. AXLINE,
*Attesting Officer.*

ROBERT C. WATSON,
                                                     *Commissioner of Patents.*